United States Patent
Kogure et al.

(10) Patent No.: US 8,744,202 B2
(45) Date of Patent: Jun. 3, 2014

(54) APPARATUS AND METHOD FOR CODING IMAGE

(75) Inventors: Nakaba Kogure, Kanagawa-ken (JP); Shinichiro Koto, Tokyo (JP); Tomoya Kodama, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 85 days.

(21) Appl. No.: 13/597,563

(22) Filed: Aug. 29, 2012

(65) Prior Publication Data

US 2013/0202218 A1 Aug. 8, 2013

(30) Foreign Application Priority Data

Feb. 2, 2012 (JP) ................................ 2012-021361

(51) Int. Cl.
- *G06K 9/36* (2006.01)
- *G06K 9/46* (2006.01)
- *H04N 7/34* (2006.01)
- *H04N 7/26* (2006.01)

(52) U.S. Cl.
CPC ... *H04N 19/00763* (2013.01); *H04N 19/00018* (2013.01); *H04N 19/00042* (2013.01); *H04N 19/0006* (2013.01)
USPC .......................................... 382/238; 382/232

(58) Field of Classification Search
None
See application file for complete search history.

(56) References Cited

U.S. PATENT DOCUMENTS

| 2007/0002945 | A1* | 1/2007 | Kim ............................ 375/240 |
| 2007/0065030 | A1* | 3/2007 | Shen et al. .................... 382/238 |
| 2011/0164677 | A1* | 7/2011 | Lu et al. ................... 375/240.02 |
| 2011/0164678 | A1 | 7/2011 | Date et al. |
| 2012/0039388 | A1* | 2/2012 | Kim et al. ............... 375/240.03 |
| 2012/0320975 | A1* | 12/2012 | Kim et al. ............... 375/240.12 |
| 2013/0058552 | A1 | 3/2013 | Date et al. |

FOREIGN PATENT DOCUMENTS

| WO | 2010041488 | 4/2010 |
| WO | 2011/114504 A1 | 9/2011 |

OTHER PUBLICATIONS

International Search Report for International Patent Application No. PCT/JP2009/060382 mailed on Sep. 8, 2009.

* cited by examiner

*Primary Examiner* — Li Liu
(74) *Attorney, Agent, or Firm* — Amin, Turocy & Watson, LLP

(57) ABSTRACT

According to one embodiment, an apparatus codes each line of an image. The apparatus includes a segmentation unit and a coding unit. The segmentation unit is configured to segment the image into a first group including at least a head line and a second group including lines except for the first group. The coding unit is configured to code the first group so that a coding amount of the first group is smaller than a first target coding amount, and to code the second group so that a coding amount of each line of the second group is smaller than a second target coding amount smaller than the first target coding amount.

8 Claims, 8 Drawing Sheets

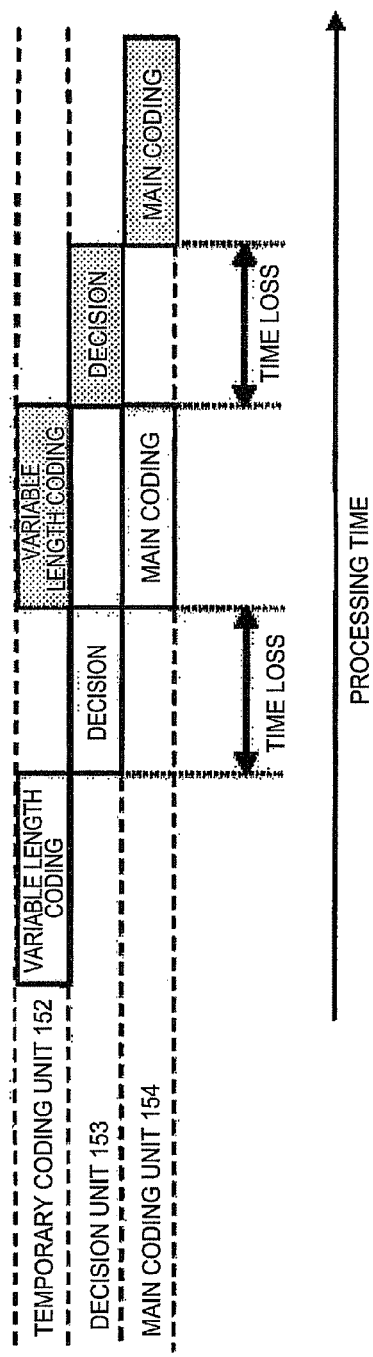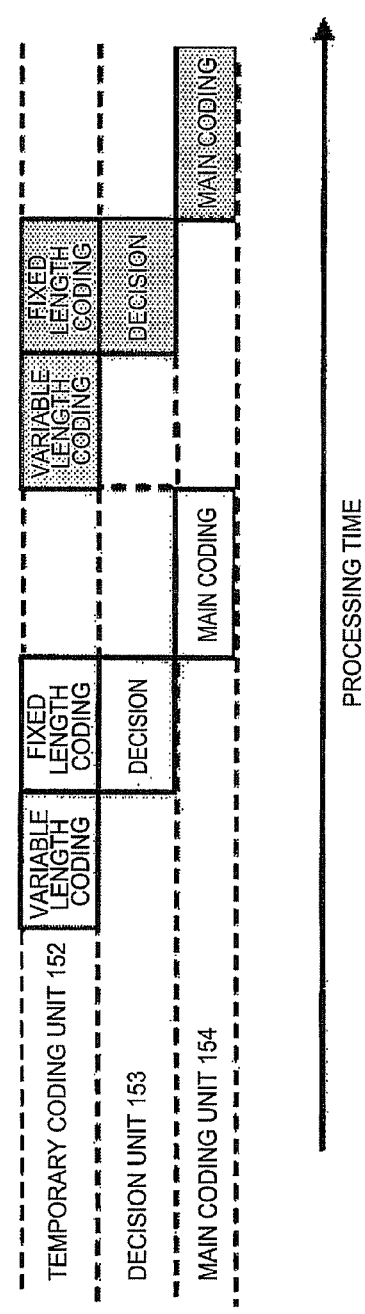
FIG. 8A
FIG. 8B

APPARATUS AND METHOD FOR CODING IMAGE

CROSS-REFERENCE TO RELATED APPLICATION

This application is based upon and claims the benefit of priority from Japanese Patent Application No. 2012-021361, filed on Feb. 2, 2012; the entire contents of which are incorporated herein by reference.

FIELD

Embodiments described herein relate generally to an apparatus and a method for coding an image.

BACKGROUND

As conventional technique, an image coding apparatus having a following function exists. When an image is coded (encoded), a coding amount of coded data of the image is adjusted by controlling a quantization level for each processing unit (For example, each line or each block of the image) of coding. This control is called "bit rate control".

For example, as bit rate control, CBR (Constant Bit Rate) control to nearly fix a coding amount of coded data for each processing unit is well known. However, as to CBR control, degradation of image quality locally occurs in the image.

In order to suppress local degradation of image quality, in the image coding apparatus of conventional technique, for each processing unit, a coding mode is selected based on the sum of a coding amount coded by a plurality of variable length coding modes (compression rates thereof are different) and a coding amount coded by a fixed length coding mode. Then, each processing unit is coded by the selected coding mode thereof.

However, in this image coding apparatus, when each line is coded, due to the selected coding mode, effective coding cannot be often performed.

BRIEF DESCRIPTION OF THE DRAWINGS

FIGS. 8A and 8B are schematic diagrams to explain effect by the modification of the first embodiment.

DETAILED DESCRIPTION

According to one embodiment, an apparatus codes each line of an image. The apparatus includes a segmentation unit and a coding unit. The segmentation unit is configured to segment the image into a first group including at least a head line and a second group including lines except for the first group. The coding unit is configured to code the first group so that a coding amount of the first group is smaller than a first target coding amount, and to code the second group so that a coding amount of each line of the second group is smaller than a second target coding amount smaller than the first target coding amount.

Various embodiments will be described hereinafter with reference to the accompanying drawings.

The First Embodiment

As to an image coding apparatus 1 of the first embodiment, for example, it is suitable for PC server to store or transmit medical image data captured by CT decide or MRI.

In the image coding apparatus 1, as to an input image acquired, a coding amount of each line therein is controlled, and pixels included in each line are coded (encoded). The image coding apparatus 1 utilizes a method for coding a differential signal value between a coding target pixel and adjacent pixel, for example, such as DPCM (Differential pulse-code modulation).

Figures 1A, 1B:
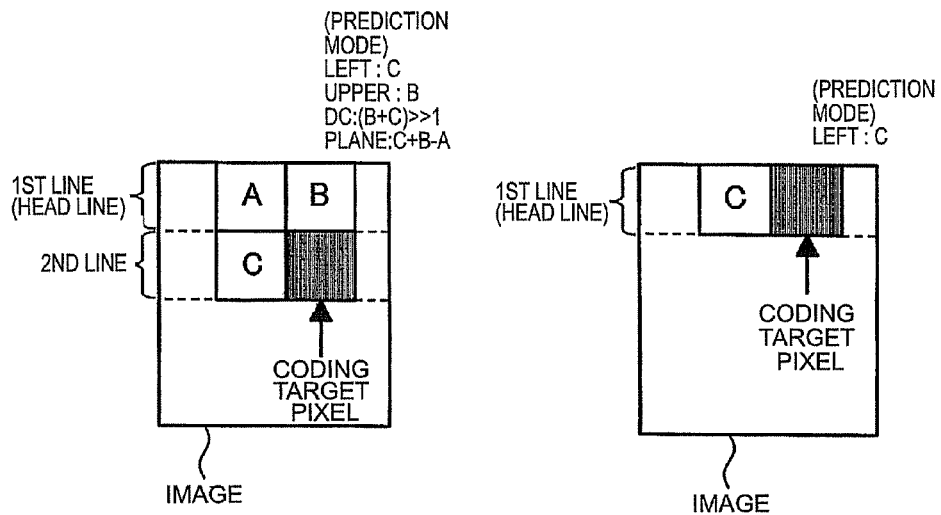
FIGS. 1A and 1B are schematic diagrams to explain DPCM coding.

FIGS. 1A and 1B are schematic diagrams to explain DPCM coding. As shown in FIG. 1A, as to a line (for example, a second line) except for a first line (head line) in the input image, a most suitable prediction mode is selected from prediction modes such as a prediction from a left pixel, a prediction from an upper pixel, a DC prediction, and a PLANE prediction.

Here, the most suitable prediction mode is a prediction mode to minimize a residual between a coding target pixel and a prediction pixel corresponding thereto. The prediction from a left pixel is a prediction mode to search a prediction pixel from adjacent pixels at the left side of the coding target pixel. The prediction from an upper pixel is a prediction mode to search a prediction pixel from adjacent pixels at the upper side of the coding target pixel. The DC prediction is a prediction mode to search a prediction pixel from adjacent pixels at the left side and the upper side of the coding target pixel. The PLANE prediction is a prediction mode to search a prediction pixel from adjacent pixels at the left side, the upper side, and the left-upper side of the coding target pixel.

On the other hand, as shown in FIG. 1B, a line at the upper side of the head line does not exist in the image. Accordingly, the prediction mode thereof is limited to the prediction from a left pixel. As a result, at the head line, coding efficiency thereof drops.

In order to solve this problem, in the image coding apparatus 1, a first target coding amount to code lines of a first group (including at least a head line) is largely set than a second target coding amount to code lines except for the first group in the image. Under this setting, pixels included in each line are coded.

Figure 2:
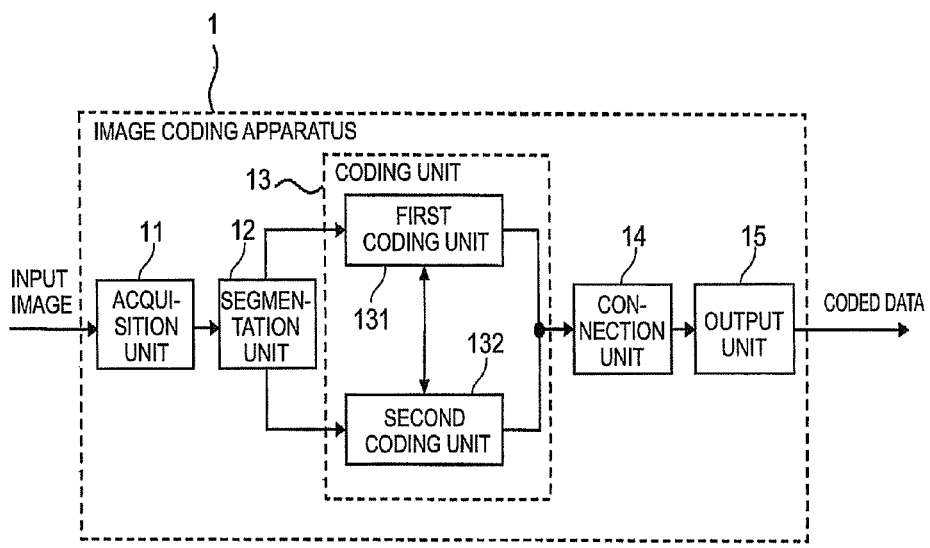
FIG. 2 is a block diagram of an image coding apparatus 1 according to a first embodiment.

FIG. 2 is a block of the image coding apparatus 1. The image coding apparatus 1 includes an acquisition unit 11, a segmentation unit 12, a coding unit 13, a connection unit 14, and an output unit 15. The coding unit 13 includes a first coding unit 131 and a second coding unit 132.

The acquisition unit 11 acquires an input image. The input image may be a static image or frames of a dynamic image.

The segmentation unit 12 segments the input image into a first group including at least a head line and a second group except for the first group. In the first embodiment, a line included in the first group is the head line only. Lines except for the head line are included in the second group.

The first coding unit 131 codes a line (head line) of the first group. In this case, the first coding unit 131 codes the line of the first group so that a coding amount of coded data of each line of the first group is smaller than (or equal to) a first target coding amount.

The second coding unit 132 codes lines (except for the head line) of the second group. In this case, the second coding unit 132 codes the lines of the second group so that a coding amount of coded data of each line of the second group is smaller than (or equal to) a second target coding amount. As mentioned-above, the second target coding amount is smaller than the first target coding amount.

The connection unit 14 connects coded data of the first group and coded data of the second group. The output unit 15 outputs the connected coded data.

The acquisition unit 11, the segmentation unit 12, the first coding unit 131, the second coding unit 132, the connection unit 14, and the output unit 15, may be realized by a CPU (Central Processing Unit) and a memory used thereby. Thus far, component of the image coding apparatus 1 is already explained.

Figure 3:
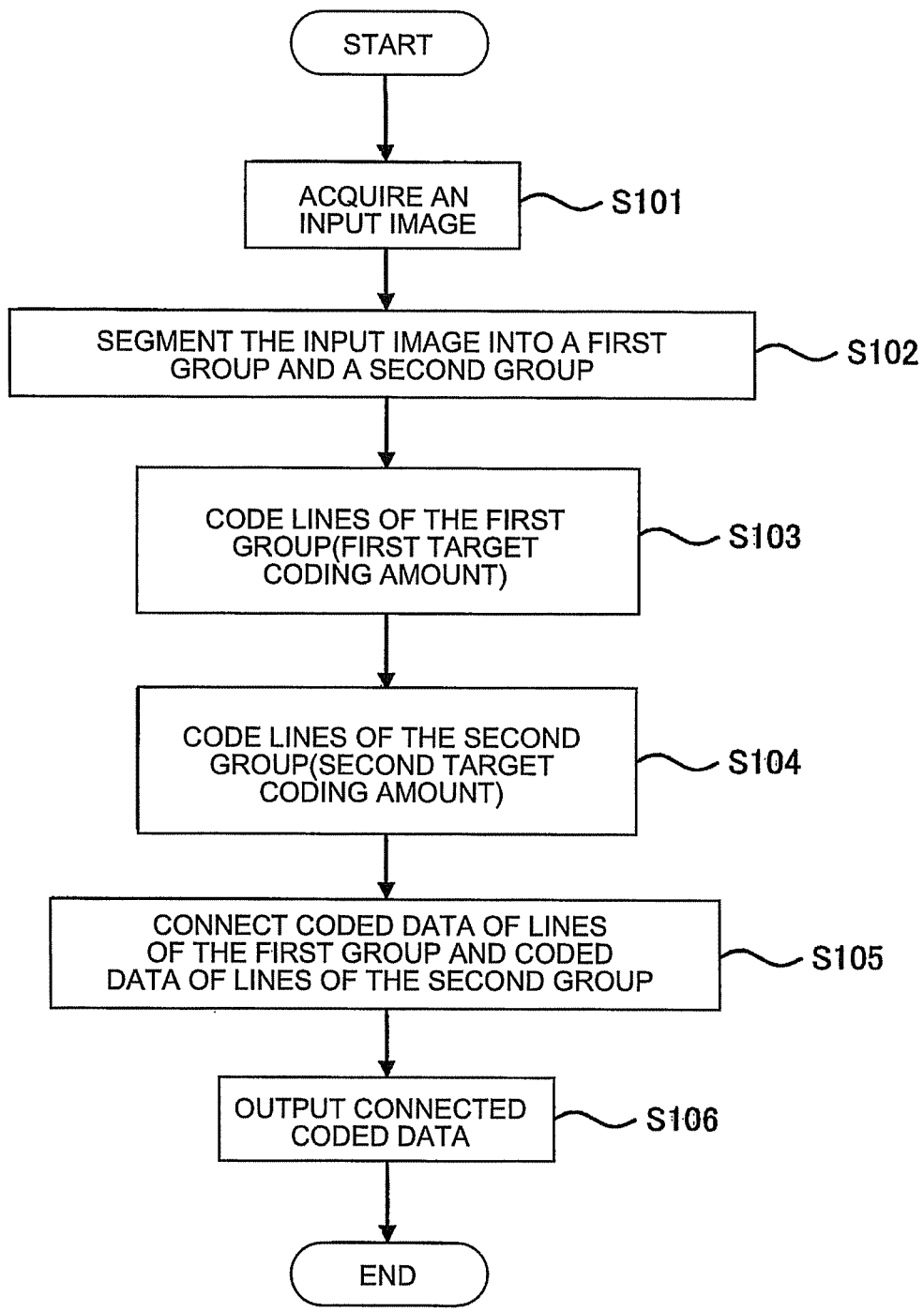
FIG. 3 is a flow chart of processing of the image coding apparatus 1.

FIG. 3 is a flow chart of processing of the image coding apparatus 1. The acquisition unit 11 acquires an input image (S101). The segmentation unit 12 segments the input image into a first group and a second group (S102).

The first coding unit 131 codes a line of the first group. Here, the first coding unit 131 codes a line of the first group so that a coding amount of coded data of each line of the first group is smaller than (or equal to) a first target coding amount (S103).

The second coding unit 132 codes lines of the second group. Here, the second coding unit 132 codes lines of the second group so that a coding amount of coded data of each line of the second group is smaller than (or equal to) a second target coding amount (S104). Moreover, when the second coding unit 132 codes a first line of lines of the second group, the second coding unit 132 had better refer a line (head line) of the first group supplied from the segmentation unit 12 to the first coding unit 131. For example, the segmentation unit 12 may supply the first group to the first coding unit 131 and the second coding unit 132.

The connection unit 14 connects coded data of the line of the first group and coded data of lines of the second group (S105). The output unit 15 outputs the connected coded data (S106). Thus far, processing of the image coding apparatus 1 is already explained.

Figure 4:
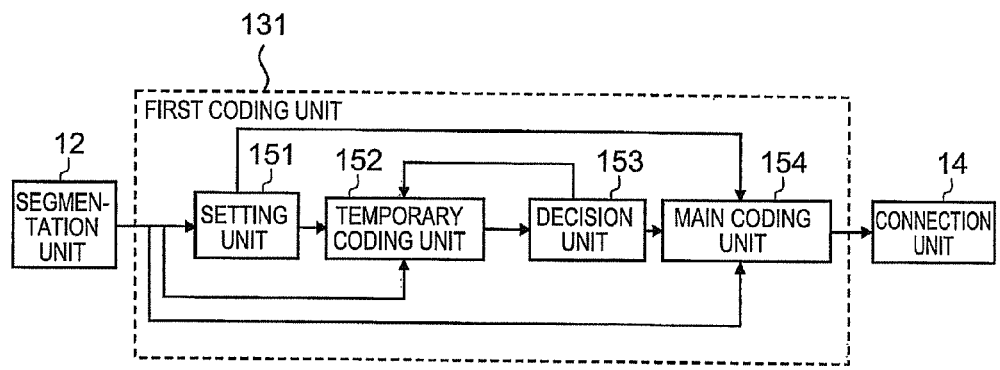
FIG. 4 is a block diagram of a first coding unit 131 in FIG. 2.

FIG. 4 is a block diagram of the first coding unit 131. As to each pixel of a line (head line) included in the first group, the first coding unit 131 codes by selecting a prediction mode to code the pixel. Moreover, following explanation is same as that of the second coding unit 132.

The first coding unit 131 includes a setting unit 151, a temporary coding unit 152, a decision unit 153, and a main coding unit 154. The setting unit 152 selects the most suitable prediction mode from each prediction mode (In the first embodiment, prediction from a left pixel, prediction from an upper pixel, DC prediction, PLANE prediction) to code a coding target pixel. For example, the setting unit 151 may select a prediction mode to maximize SAD (Sum of Absolute Difference) as the most suitable prediction mode. Here, one pixel is explained as a coding target pixel. However, a block including a plurality of pixels may be coding target pixels.

The temporary coding unit 152 codes a coding target pixel with variable length coding, by a plurality of quantization parameters (QP) previously set. The plurality of quantization parameters is mutually different. Moreover, if Golomb-Rice coding is used as variable length coding, the temporary coding unit 152 generates a coding table with coding of the coding target pixel.

The decision unit 153 decides whether a coding amount of the coding target pixel coded by each QP is smaller than the first target coding amount. When a plurality of QPs by which the coding amount is smaller than the first target coding amount exists, the decision unit 153 selects the minimum QP (a parameter having the smallest quantization level) from the plurality of QPs, and supplies decision information representing the minimum QP to the main coding unit 154 (explained afterwards). When at least one QP by which the coding amount is smaller than the first target coding amount does not exist, the decision unit 153 supplies decision information representing that QP does not exist to the main coding unit 154. Furthermore, the decision unit 153 supplies a coding target pixel to be coded by the selected QP to the temporary coding unit 152 (detail processing thereof is explained afterwards).

The main coding unit 154 codes the coding target pixel according to the prediction mode (selected) and the decision information. Briefly, when QP by which the coding amount is smaller than the first target coding amount exists, the main coding unit 154 codes the coding target pixel by variable length coding, based on the prediction mode (selected) and QP in the decision information supplied by the decision unit 153. When QP by which the coding amount is smaller than the first target coding amount does not exist, the main coding unit 154 codes the coding target pixel by fixed length coding so that coded data of the coding target pixel is smaller than the first target coding amount.

Figure 5:
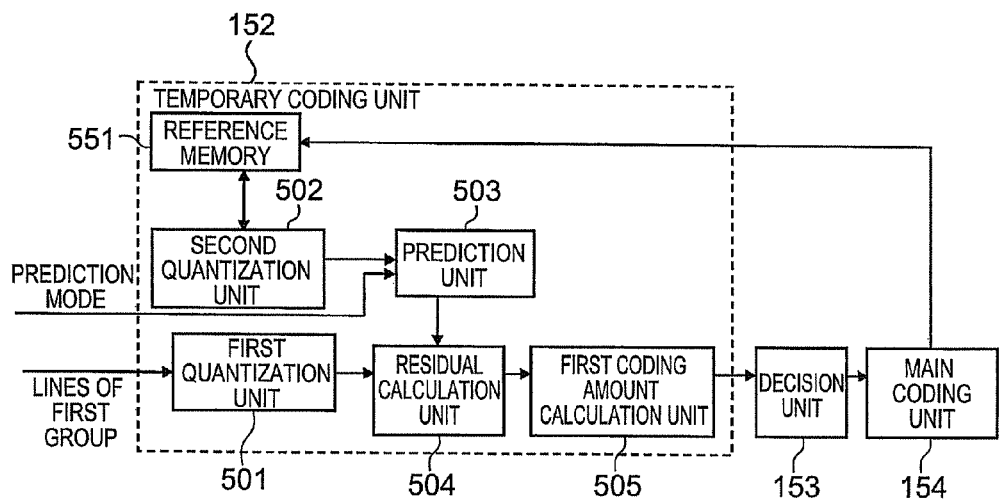
FIG. 5 is a block diagram of a temporary coding unit 152 in FIG. 2.

FIG. 5 is a block diagram of the temporary coding unit 152. The temporary coding unit 152 includes a first quantization unit 501, a second quantization unit 502, a prediction unit 503, a residual calculation unit 504, and a first coding amount calculation unit 505.

A reference memory 551 stores a pixel value of a previous coding target pixel. The pixel value of the previous coding target pixel was already coded by the main coding unit 154 using QP (selected by the decision unit 153). Briefly, the decision unit 153 writes the pixel value of the previous coding target pixel to be coded with QP (selected thereby) into the reference memory 551, as a reference pixel for the present coding target pixel.

The first quantization unit 501 quantizes a pixel value of the present coding target pixel. The second quantization unit 502 reads a reference pixel from the reference memory 551, and quantizes the reference pixel. The prediction unit 503 determines a prediction pixel for the present coding target pixel according to the prediction mode already set.

A residual calculation unit 504 calculates a residual value between the prediction pixel and the present coding target pixel. The first coding amount calculation unit 505 codes the residual value with each QP by variable length coding, and calculates a coding amount of the coded residual value for each QP.

Figure 6:
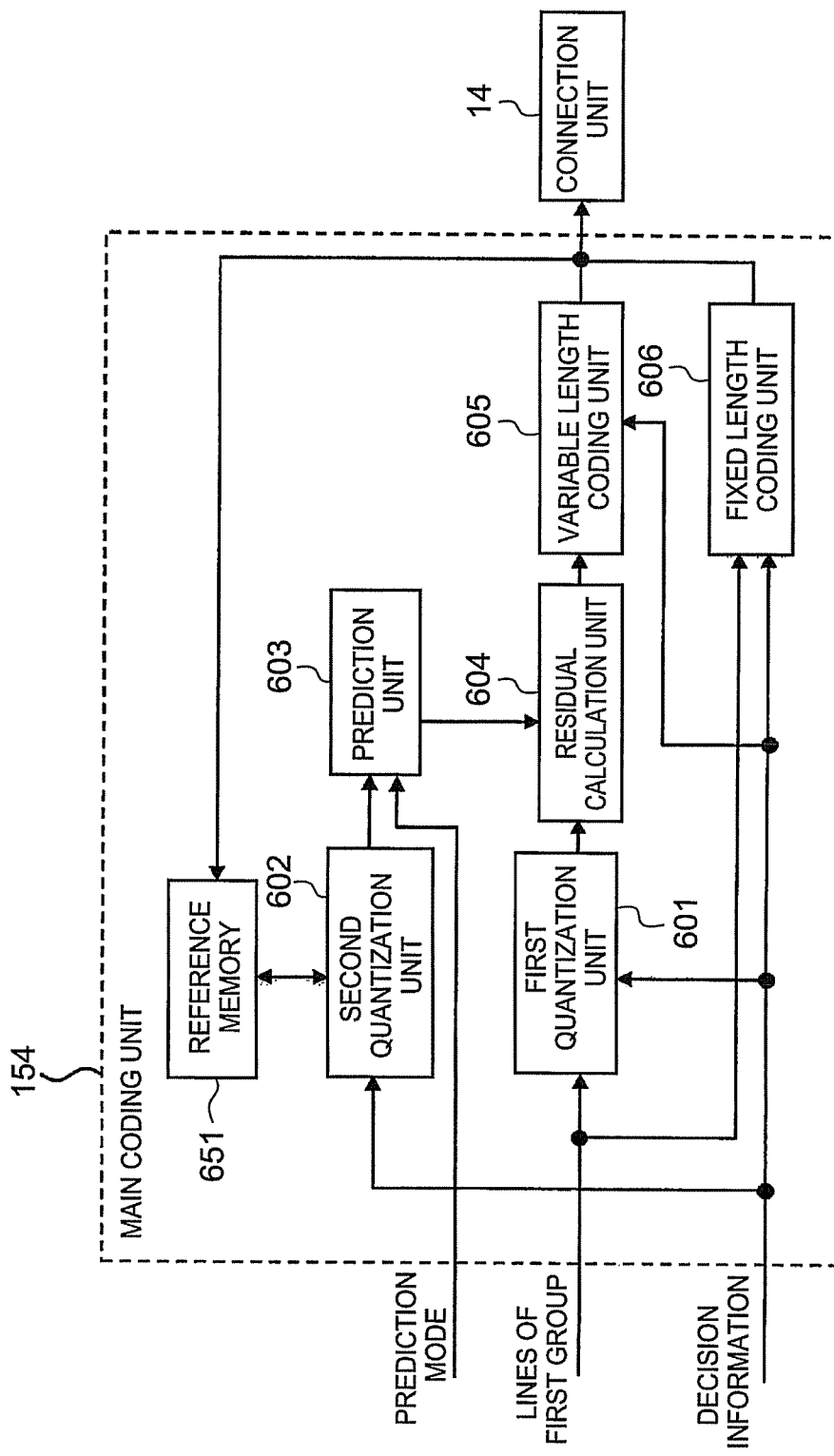
FIG. 6 is a block diagram of a main coding unit 154 in FIG. 2.

FIG. 6 is a block diagram of the main coding unit 154. The main coding unit 154 includes a first quantization unit 601, a second quantization unit 602, a prediction unit 603, a residual calculation unit 604, a variable length coding unit 605, and a fixed length coding unit 606.

The first quantization unit 601 quantizes a pixel value of the present coding target pixel by QP included in the decision information. The second quantization unit 602 reads a reference pixel from the reference memory 651, and quantizes the reference pixel by QP included in the decision information. Here, the reference memory 651 stores coded data of pixel values of previous pixel values. This coded data is supplied by the variable length coding unit 605 and the fixed length coding unit 606 (explained afterwards).

The prediction unit 603 determines a prediction pixel for the present coding target pixel according to the prediction mode already set. A residual calculation unit 604 calculates a residual value between the prediction pixel and the present coding target pixel.

The variable length coding unit 605 codes the residual value by variable length coding. If Golomb-Rice coding is used as variable length coding method, the variable length coding unit 605 codes the residual value using a coding table generated by the temporary coding unit 152.

When the decision unit 153 decides that QP smaller than the first target coding amount does not exist, the fixed length coding unit 606 codes the coding target pixel by fixed length coding according to the decision information. In this case, the fixed length coding unit 606 codes the coding target pixel so that a coding amount of the coding target pixel is smaller than the first target coding amount. Here, for example, the fixed length coding is realized by extracting high-order bits from the coding target pixel so that the coding amount thereof is smaller than the first target coding amount.

In the first embodiment, the first target coding amount to code lines of the first group (including at least head line) is set to a larger value than the second target coding amount to code lines except for the first group in the image. Under this setting, pixel values of each line are coded.

As a result, in the first embodiment, when each line of the image is coded, effective coding can be performed while local degradation of image quality is suppressed.

Moreover, in the first embodiment, an example having four prediction modes (prediction from a left pixel, prediction from an upper pixel, DC prediction, PLANE prediction) is explained. However, the prediction mode is not limited to this example. For example, the number of prediction modes may be two or eight. Here, if four prediction modes are used, information of the prediction modes can be represented as two bits. Accordingly, in this case, processing load is not high, and coding efficiency is also excellent.

(Modification 1)

Figure 7:
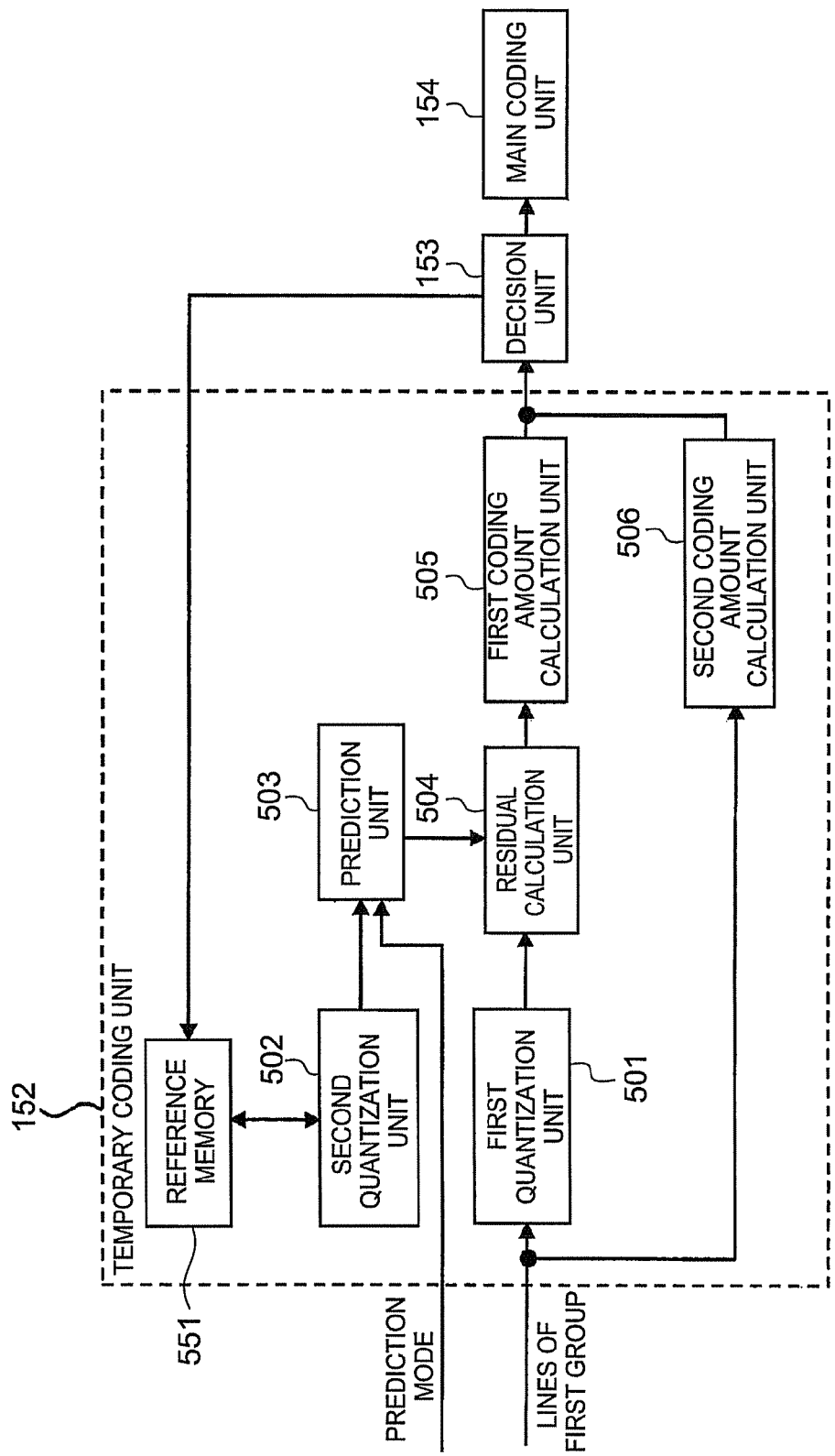
FIG. 7 is a block diagram of the temporary coding unit 152 according to a modification of the first embodiment.

As to modification 1 of the first embodiment, the temporary coding unit 152 further includes a second coding amount calculation unit 506. FIG. 7 is a block diagram of the temporary coding unit 152. In the modification 1, among pixel values of one pixel line to be supplied to the first coding unit 131, the segmentation unit 12 supplies pixel values from the head pixel to N-th pixel to the first quantization unit 501, and supplies pixel values from (N+1)-th pixel to the end pixel to the second coding amount calculation unit 506. The second coding amount calculation unit 506 codes the pixel value (supplied from the segmentation unit 12) by a predetermined target coding amount.

FIGS. 8A and 8B are schematic diagrams to explain effect of the modification 1. FIG. 8A shows a relationship of processing time among the temporary coding unit 152, the decision unit 153 and the main coding unit 154, when the temporary coding unit 152 codes the coding target pixel by variable length coding. Briefly, FIG. 8A corresponds to the first embodiment. FIG. 8B shows a relationship of processing time among the temporary coding unit 152, the decision unit 153 and the main coding unit 154, when the temporary coding unit 152 codes the coding target pixel by variable length coding or fixed length coding. Briefly, FIG. 8B corresponds to the modification 1.

As shown in FIG. 8A, in the first embodiment, when the temporary coding unit 152 completes coding of one pixel line by variable length coding, the decision unit 153 decides whether a coding amount of the coding target pixel coded by each QP is smaller than the first target coding amount. As a result, a time loss occurs between a time at which the temporary coding unit 152 completes coding of one pixel line and a time at which the main coding unit 154 starts coding of the one pixel line.

On the other hand, as shown in FIG. 8B, in the modification 1, when the temporary coding unit 152 completes coding of pixel values from the head pixel to N-th pixel in the one pixel line, the decision unit 153 decides whether a coding amount of the coding target pixel coded by each QP is smaller than the first target coding amount. As a result, the time loss occurs. Because, in the fixed length coding, a coding amount thereby is previously determined.

As mentioned-above, in the modification 1, in comparison with the first embodiment, coding can be more quickly executed.

The Second Embodiment

As to an image coding apparatus 2 of the second embodiment, an input image acquired is segmented into a head line, a second group including lines from a second line to m-th line (m is an integral number larger than or equal to "2"), and a third group including lines from (m+1)-th line to an end line.

The image coding apparatus 2 codes the head line so that a coding amount thereof is smaller than a first target coding amount, codes each line of the second group so that a coding amount thereof is smaller than a second target coding amount (smaller than the first target coding amount), and codes each line of the third group so that a coding amount thereof is smaller than a third target coding amount (smaller than the first target coding amount).

As a result, in comparison with the first embodiment, while local degradation of image quality is suppressed, a coding amount of coded data can be further reduced.

Figure 9:
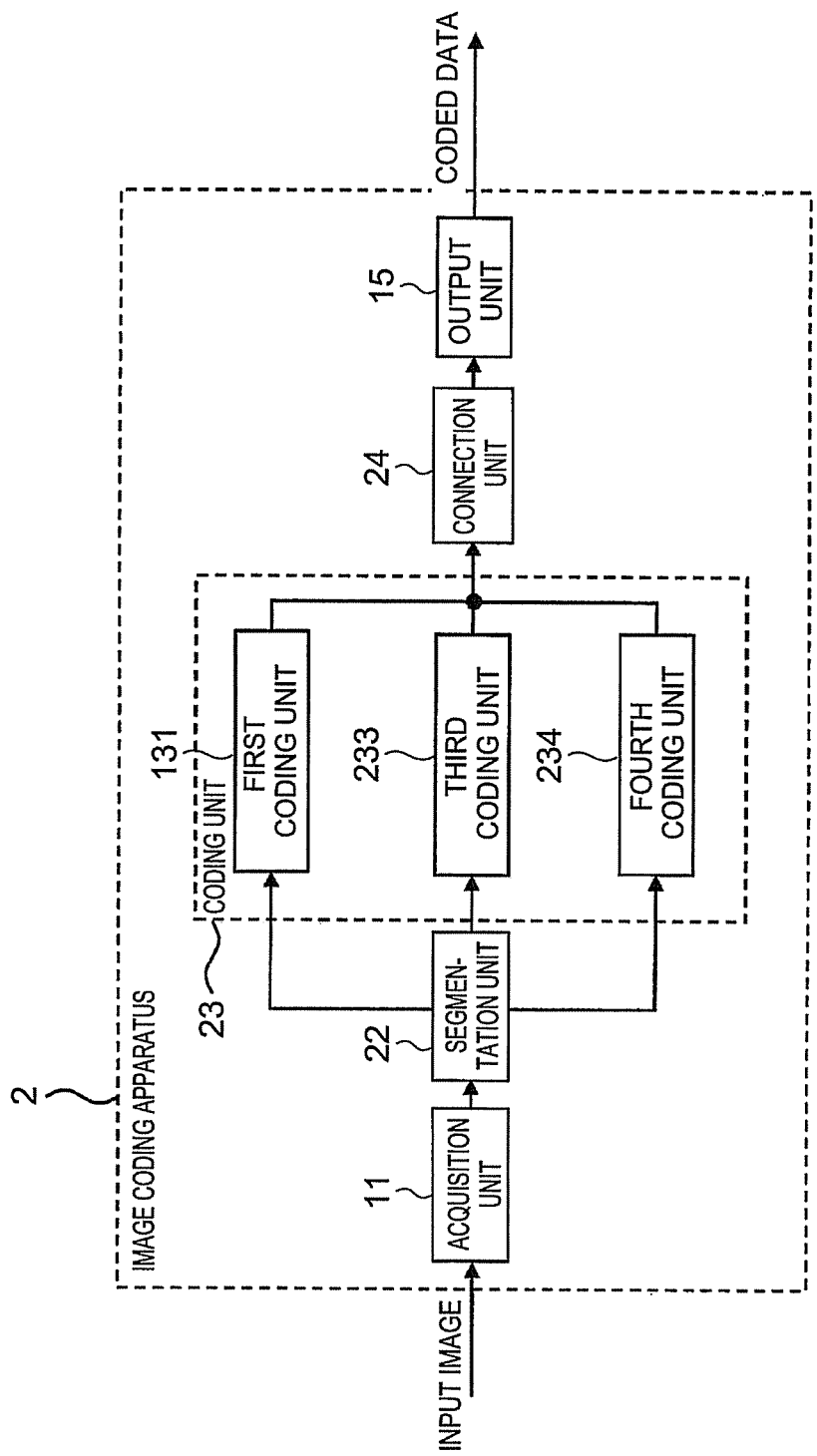
FIG. 9 is a block diagram of an image coding apparatus 2 according to a second embodiment.

FIG. 9 is a block diagram of the image coding apparatus 2. In comparison with the image coding apparatus 1, the segmentation unit 12, the coding unit 13 and the connection unit 14 are respectively replaced with a segmentation unit 22, a coding unit 23 and a connection unit 24. The coding unit 23 includes the first coding unit 131, a third coding unit 233 and a fourth coding unit 234. The first coding unit 131 is the same as that of the first embodiment (when the first group includes the head line only).

The segmentation unit 22 segments the input image into a head line, a second group including lines from a second line to m-th line, and a third group including lines from (m+1)-th line to an end line.

The third coding unit 233 codes lines of the second group. In this case, the third coding unit 233 codes lines of the second group so that a coding amount thereof is smaller than the second target coding amount. As mentioned-above, the second coding target amount is smaller than the first target coding amount.

The fourth coding unit 234 codes lines of the third group. In this case, the fourth coding unit 234 codes lines of the third group so that a coding amount thereof is smaller than the third target coding amount. As mentioned-above, the third coding target amount is smaller than the first target coding amount.

The connection unit 24 connects coded data of the head line, coded data of lines of the second group, and coded data of lines of the third group.

The segmentation unit 22, the third coding unit 233, the fourth coding unit 234 and the connection unit 24, may be realized by a CPU and a memory used thereby.

Thus far, as to component of the image coding apparatus 2, a feature different from that of the image coding apparatus 1 is already explained.

Figure 10:
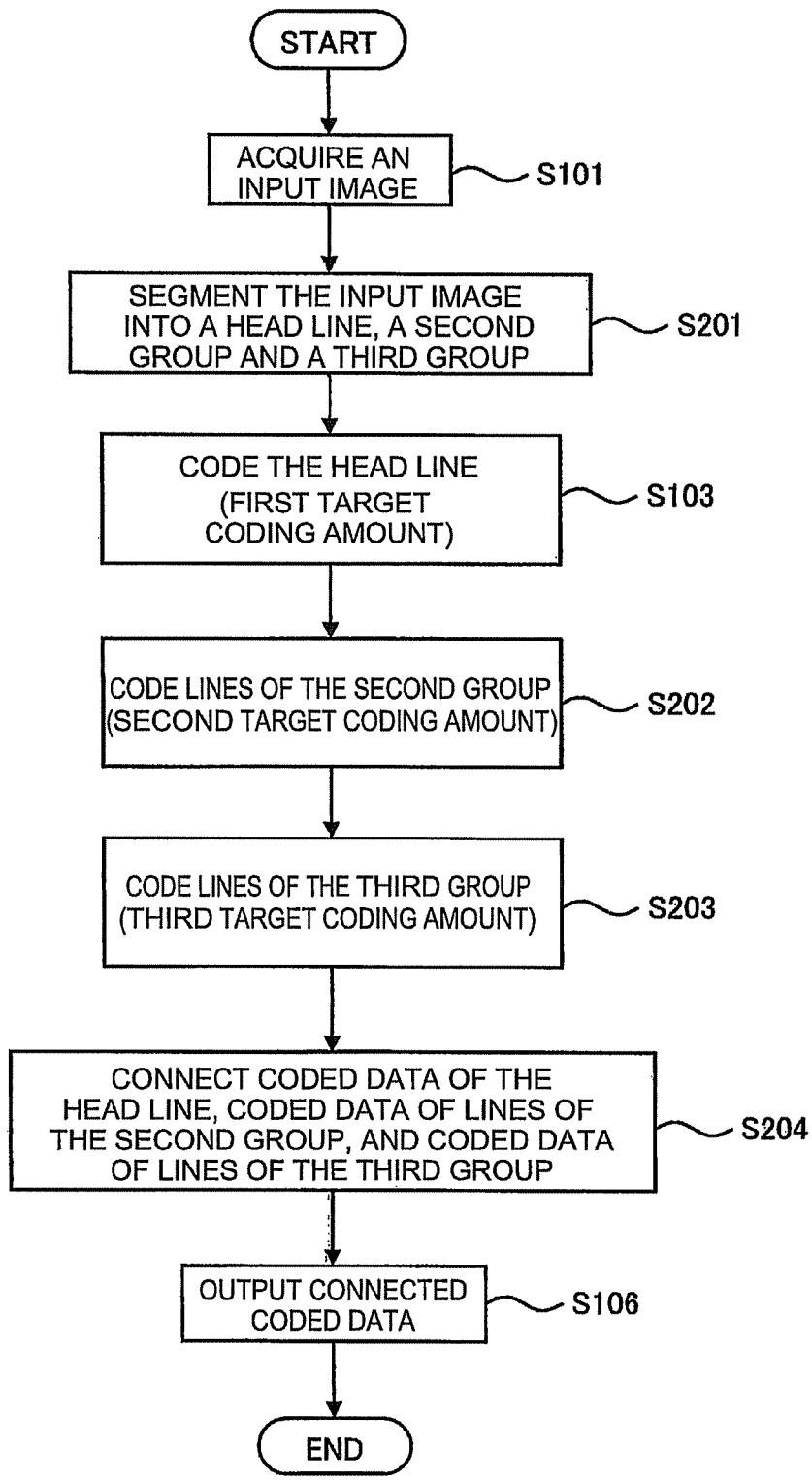
FIG. 10 is a flow chart of processing of the image coding apparatus 2.

FIG. 10 is a flow chart of processing of the image coding apparatus 2. In comparison with the flow chart (FIG. 3) of the image coding apparatus 1, steps having different signs will be only explained.

At S201, the segmentation unit 22 segments the input image into the head line, the second group and the third group (S201).

At S202, the third coding unit 233 codes lines of the second group (S202). In this case, the third coding unit 233 codes lines of the second group so that a coding amount thereof is smaller than the second target coding amount.

At S203, the fourth coding unit 234 codes lines of the fourth group (S203). In this case, the fourth coding unit 234 codes lines of the third group so that a coding amount thereof is smaller than the third target coding amount.

At S204, the connection unit 24 connects coded data of the head line, coded data of lines of the second group, and coded data of lines of the third group (S204).

Thus far, as to processing of the image coding apparatus 2, a feature different from that of the image coding apparatus 1 is already explained.

As to the second embodiment, in comparison with the first embodiment, while local degradation of image quality is suppressed, a coding amount of coded data can be further reduced.

As mentioned-above, in the first and second embodiments, coding can be quickly and effectively performed. Moreover, for example, the image coding apparatus thereof can be realized by using a general purpose computer as a basic hardware.

In the first and second embodiments, a format of coded data will be explained. For example, if DPCM and Golomb-Rice coding are combined as a coding method, coded data thereby includes a QP value, an index of coding table, an index of prediction mode, a prefix and a suffix of Golomb-Rice coding.

As to the number of pixels to be targeted for the QP value, the index of coding table and the index of prediction mode, if a range thereof satisfies "(QP value)>(index of coding table)>(index of prediction mode)", coding efficiency rises.

Furthermore, in Golomb-Rice coding, a prefix is determined by a variable-length unary code, and a suffix length is determined by an index and a prefix length.

For example, assume that a pixel value signal Y is segmented into Y1, Y2 and Y3, a symbol of Y1 is "0000011010" (prefix "000001", suffix "1010"), a symbol of Y2 is "0000111111" (prefix "00001", suffix "11111"), and a symbol of Y3 is "01101" (prefix "01", suffix "101"). Here, prefixes of Y1, Y2 and Y3 is regarded as one continuous prefix "0000010000101", and suffixes of Y1, Y2 and Y3 are regarded as one continuous suffix "101011111101". In this case, interleave processing of Y1, Y2 and Y3 can be performed. As a result, in comparison with the case that Y is not segmented, a plurality of blocks (In this example, three blocks Y1, Y2 and Y3) can be quickly decoded per one cycle.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for coding each line of an image, comprising:
    a segmentation unit configured to segment the image into a first group including at least a head line and a second group including lines except for the first group; and
    a coding unit configured to code the first group so that a coding amount of the first group is smaller than a first target coding amount, and to code the second group so that a coding amount of each line of the second group is smaller than a second target coding amount smaller than the first target coding amount.

2. The apparatus according to claim 1, wherein
the segmentation unit segments the image into the first group consisting of the head line, and the second group including at least one line except for the head line.

3. The apparatus according to claim 1, wherein
the segmentation unit segments the image into the first group consisting of the head line, the second group including lines from a second line to m-th line (m is an integral number larger than or equal to two), and a third group including lines from (m+1)-th line to an end line, and
the coding unit codes the third group so that a coding amount of each line of the third group is smaller than a third target coding amount smaller than the first target coding amount.

4. The apparatus according to claim 1, further comprising:
a connection unit configured to connect coded data of the first group and coded data of the second group.

5. A method for coding each line of an image, comprising:
segmenting the image into a first group including at least a head line and a second group including lines except for the first group;
coding the first group so that a coding amount of the first group is smaller than a first target coding amount; and
coding the second group so that a coding amount of each line of the second group is smaller than a second target coding amount smaller than the first target coding amount.

6. The method according to claim 5, wherein
the segmenting comprises
    segmenting the image into the first group consisting of the head line, and the second group including at least one line except for the head line.

7. The method according to claim 5, wherein
the segmenting comprises
    segmenting the image into the first group consisting of the head line, the second group including lines from a second line to m-th line (m is an integral number larger than or equal to two), and a third group including lines from (m+1)-th line to an end line, and
the coding comprises
    coding the third group so that a coding amount of each line of the third group is smaller than a third target coding amount smaller than the first target coding amount.

8. The method according to claim 5, further comprising:
connecting coded data of the first group and coded data of the second group.

* * * * *